United States Patent

[11] 3,545,468

[72] Inventors Peter A. Freeman
Baltimore;
Robert A. Bean, Rockville, Maryland
[21] Appl. No. 822,272
[22] Filed May 6, 1969
[45] Patented Dec. 8, 1970
[73] Assignee Bowles Engineering Corporation
Silver Spring, Maryland
a corporation of Maryland

[54] LIQUID LEVEL CONTROLLER EMPLOYING VORTEX VALVE
8 Claims, 4 Drawing Figs.

[52] U.S. Cl. ................................................. 137/81.5
[51] Int. Cl. ................................................. F15c 1/16
[50] Field of Search ..................................... 137/81.5, 393

[56] References Cited
UNITED STATES PATENTS

| | | | |
|---|---|---|---|
| 3,195,303 | 7/1965 | Widell | 137/81.5X |
| 3,267,946 | 8/1966 | Adams et al. | 137/81.5 |
| 3,276,259 | 10/1966 | Bowles et al. | 137/81.5X |
| 3,392,741 | 7/1968 | Shinn | 137/81.5 |
| 3,410,187 | 11/1968 | Heyden et al. | 137/81.5X |
| 3,417,772 | 12/1968 | Schaeffer | 137/81.5 |
| 3,463,178 | 8/1969 | Kirchmier | 137/81.5 |
| 3,467,122 | 9/1969 | Jones | 137/81.5 |

Primary Examiner—Samuel Scott
Attorney—Hurvitz, Rose, and Greene

ABSTRACT: Liquid level control in a boiler other pressurized liquid container is achieved with a vortex valve. Outflow from the container is split between supply and bias inlets at the periphery of the vortex valve chamber, the supply flow issuing radially into the chamber and the bias flow issuing tangentially into the chamber. A sensor tube has its sensing end disposed at a predetermined level in the tank and is connected to a control inlet at the chamber periphery from which control flow issues tangentially into the chamber in opposition to the bias flow. Liquid above the predetermined level flows through the control inlet with sufficient momentum to balance the bias flow, causing the supply, bias and control flows to flow radially and unimpeded to an axial outlet passage. When the liquid is below the predetermined level, vapor in the container flows through the control inlet with insufficient momentum to overcome the bias flow which deflects the supply flow into a throttled vortical flow path to the outlet passage.

Liquid level is similarly achieved in an unpressurized liquid container, the vortex valve chamber being disposed lower than said predetermined level and the sensor tube being oriented to permit liquid above said predetermined level to flow from the tank to the control inlet of the valve.

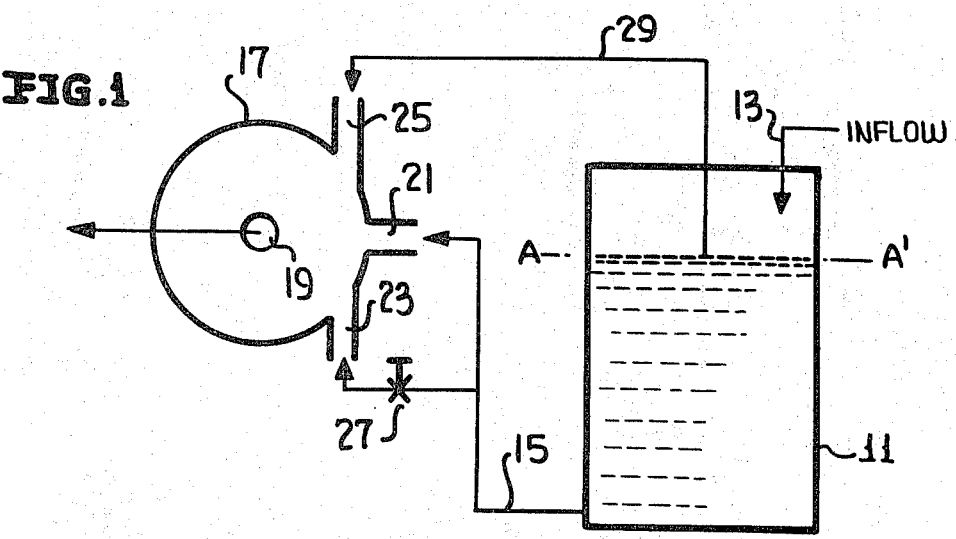
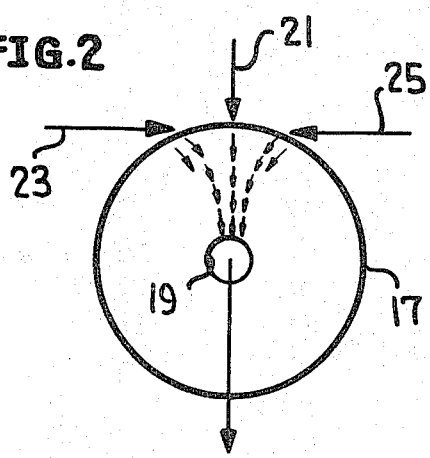
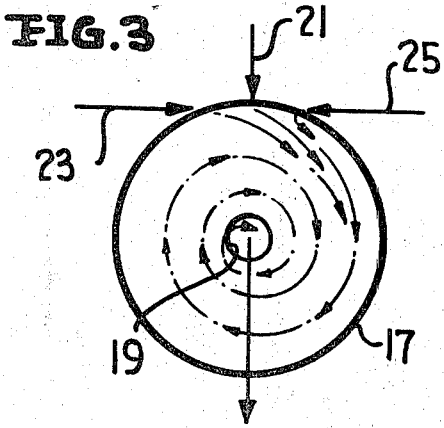
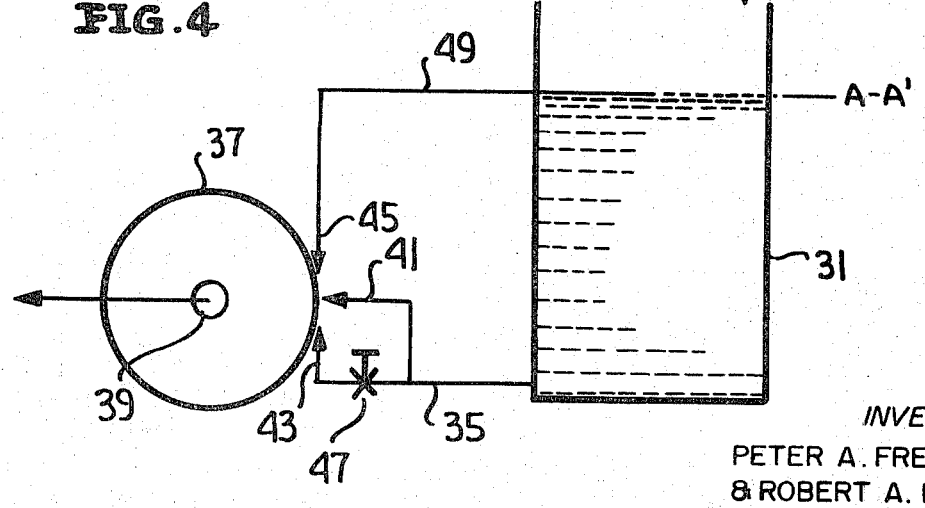
INVENTORS
PETER A. FREEMAN
& ROBERT A. BEAN
BY *Hurvitz, Rose & Greene*
ATTORNEYS

3,545,468

LIQUID LEVEL CONTROLLER EMPLOYING VORTEX VALVE

BACKGROUND OF THE INVENTION

The present invention relates to fluidic liquid level controllers, and more particularly to such controllers which selectively vary the outflow from a liquid container in order to maintain the liquid at or below a predetermined level.

Level detection and control by means of fluidic components is known in the prior art, as witnessed by U.S. Pat. Nos. 3,267,949 and 3,277,194. The advantages of fluidics over mechanical valves for performing these functions include the absence of mechanical moving parts from fluidic elements; more specifically, mechanical valves tend to stick or otherwise fail, thereby providing unreliable level detection and control. Heretofore, fluidic level detection and control functions have been employed with filling operations whereby the inflow of liquid into a container is controlled by the liquid level in the container. In some level control applications however, it is more practical to control the container outflow in accordance with container liquid level. This is particularly true in the case of closed pressurized containers such as boilers, from which the outflow is employed to perform a specified function. At present, level controlled outflow functions are performed by mechanical valves.

It is therefore an object of the present invention to provide a fluidic liquid level detection and control apparatus for controlling the outflow of liquid from a container.

It is another object of the present invention to provide a fluidic apparatus for controlling the outflow of liquid from a pressurized container in accordance with the level of liquid in the container.

SUMMARY OF THE INVENTION

In accordance with the principles of the present invention, outflow from a pressurized container is passed through a vortex valve which is selectively throttled as a function of the liquid level in the container. The outflow is split into a supply flow directed radially across the valve and a bias flow directed tangentially into the valve. Control is achieved with a sensor tube having an inlet at the desired liquid height in the container and an outlet oriented to issue control flow tangentially into the valve in opposition to the bias flow. The sensor tube issues liquid into the valve when the liquid level is higher than desired and issues vapor into the valve when the liquid level is lower than desired. When the control flow is liquid, the effect of the bias flow is balanced and the supply, bias and control flows are directed radially and without substantial impedance across the valve. When the control flow is vapor, the latter is insufficient to overcome the bias flow which deflects the supply flow into a vortical flow pattern across the valve chamber. When a vortex is induced in the valve chamber, a pressure gradient is created across the chamber causing a high-pressure downstream of the supply inlet and an increased impedance to flow through the vortex valve. Valve outflow is thus controlled by the liquid level in the tank.

In another aspect of the present invention, the liquid container need not be pressurized in order to achieve the level detection and control described above. In this case the sensor tube is arranged to flow control fluid to the vortex valve by gravity feed to oppose the bias flow whenever the level in the container is above the desired level.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a schematic illustration of a preferred embodiment of the present invention;

FIGS. 2 and 3 are respective diagrammatic illustrations of respective operating modes of a vortex valve employed in the present invention; and FIG. 4 is a schematic illustration of an alternate embodiment of the present invention.

DESCRIPTION OF THE PREFERRED EMBODIMENTS

Referring now to FIG. 1 of the accompanying drawings there is illustrated a closed container or tank 11 containing liquid and vapor under pressure. For example, tank 11 may represent a boiler. Liquid inflow means 13 are provided for supplying liquid to the tank and an outflow passage 15 is provided to conduct liquid outflow from the tank. The liquid level detection and control arrangement of the present invention is intended to maintain the liquid in tank 11 at a specified level A-A' in spite of inflow variations greater or less than some nominal inflow.

A vortex valve 17 comprises a cylindrical chamber having an axial outlet passage 19, a supply inlet port 21, a bias inlet port 23 and a control inlet port 25. Supply inlet port 21 is arranged to issue pressurized fluid received thereby radially across the cylindrical chamber to outlet passage 19. Bias port 23 and control port 25 are disposed to issue fluid received thereby in substantial opposition and tangential to the valve chamber. In the particular embodiment illustrated in FIG. 1, control port 25 and bias port 23 are arranged in substantial opposition on opposite sides of supply port 21; however, this configuration is by way of example only since the control and bias ports may be otherwise disposed as long as their resulting outflows are tangentially issued into the valve chamber and in opposite directions to one another.

Outflow from tank 11 via passage 15 is applied directly to supply port 21 and is also applied through an adjustable pressure dropping flow restrictor 27 to bias port 23. A sensor tube 29 has its inlet end disposed in tank 11 at level A-A' and its downstream end connected to control port 25.

In operation, when the liquid in tank 11 is above level A-A', liquid flows through sensor tube 29 to control port 25 and issues tangentially into the chamber of valve 17. Adjustable flow restrictor 27 is adjusted so that the outflow from tank 11 flowing to bias port 23 just balances the liquid control flow through control port 25. The resulting flow pattern is illustrated in FIG. 2 wherein the bias, supply, and control flows merge and flow radially across the valve chamber and out through outlet passage 19. There is minimal impedance to flow in this mode and therefore the outflow from tank 11 is maximum. Note that in addition to the low impedance to supply flow in this mode, there is substantial additional liquid outflow from tank 11 in the form of control flow through sensor tube 29 and control port 25.

When the liquid in pressurized tank 11 is below level A-A', there is no liquid flow through sensor tube 29, rather, vapor, present above the liquid in tank 11, flows through sensor tube 29 to control port 25. In a typical case of a boiler, control port 25 can be adjusted to pass twenty-five times the mass flow of saturated water as saturated steam. The number twenty-five depends upon the specific operating pressure and type of liquid in the boiler; it is not a unique number which would limit the invention. Similarly large ratios of liquid-to-vapor mass flows are achieved with other liquids, the control port being sized to provide a maximum liquid flow without providing a vapor flow that effectively opposes the the bias flow. Consequently, the flow pattern in the chamber of valve 17 is vortical as illustrated in FIG. 3. More specifically, the vapor flowing through sensor tube 29 condenses upon contact with the supply flow, allowing the bias flow to predominate and create a vortical flow pattern. As is well known, when a vortex is induced in the valve chamber, a pressure gradient is created across the chamber causing a high pressure at the perphery of the chamber and increasing the impedance to supply flow through the chamber. Total outflow from tank 11 is therefore reduced by virtue of the increased impedance. Moreover, since control port 25 is flowing vapor in this mode at about one twenty-fifth (for example) the mass flow of liquid in the previously described mode, there is an additional reduction in tank outflow.

In actual operation when the inflow to tank 11 is steady, the liquid level in tank 11 limit-cycles about the inlet of sensor tube 29 causing a mixture of liquid and vapor to enter the tube. Under these conditions a relatively weak vortex is created in the valve chamber, keeping the tank outflow at some steady intermediate level. If the inflow to the tank increases, the liquid level tries to rise, causing an increase in the proportion of liquid in the sensor tube, lessening the vortex and allowing greater tank outflow. Contrarily, lowering the inflow to the tank increases the proportion of vapor in tube 29 and thereby strengthens the vortex and lessens tank outflow.

Referring now to FIG. 4, an alternate embodiment of the present invention is employed to control the liquid level in a nonpressurized tank 31. Inflow means 33 supplies liquid to the tank and outflow is provided through an outlet passage 35.

A vortex valve 37, similar in configuration to valve 17 of FIG. 1, includes an axial outlet passage 39, a radially directed supply inlet port 41, and opposed tangentially oriented bias and control ports 43 and 45 respectively. Outlet passage 35 is connected directly to supply port 41 and through adjustable flow restrictor 47 to bias port 43.

A sensor tube 49 has its inlet end disposed at control level A-A' in tank 31 and supplies flow to control port 45. Sensor tube 49 and valve 17 are oriented so that liquid in tank 31 above level A-A' is gravity fed to control port 45. The adjustable restrictor 47 is set to balance liquid flow through sensor tube 49.

Operation of the arrangement in FIG. 4 is similar to that for FIG. 1 except for the absence of vapor flow when liquid is below level A-A' in tank 31. In this mode there is no flow through control port 45 and a strong vortex is formed in valve 37 which impedes outflow from tank 31. When liquid rises above level A-A', the vortex terminates and substantially unimpeded radial flow, including the supply, bias, and control flows, traverse the valve chamber and egress through passage 39.

While we have described and illustrated specific embodiments of our invention, it will be clear that variation of the details of construction which are specifically illustrated and described may be resorted to without departing from the true spirit and scope of the invention as defined in the appended claims.

We claim:
1. A fluidic apparatus for controlling the liquid level in a container, said apparatus comprising:
   means for outflowing liquid from said container;
   a sensor tube having an inlet end disposed at a predetermined level in said container and an outlet end;
   a vortex valve having a chamber of circular cross section, an outlet passage disposed axially of said chamber for conducting fluid from said chamber, a supply inlet port responsive to pressurized fluid applied thereto for issuing a fluid stream radially across said chamber toward said outlet passage, and control and bias inlet ports responsive to pressurized fluid thereto for issuing respective control and bias flows into said chamber tangentially of said circular cross section, said control flow being directed in an opposite sense to said bias flow;
   means for connecting said outlet end of said sensor tube to said control port such that liquid from said container flows to said control port whenever the liquid in said container is above said predetermined level;
   means for applying said outflowing liquid to said supply and bias ports; and
   pressure-dropping means connected to said bias port for reducing the flow of said outflowing liquid to said bias port sufficiently to render the mass flow rates of said control and bias flows equal and opposite whenever the liquid in said container is above said predetermined level.

2. The apparatus according to claim 1 wherein said container is a pressurized tank and wherein vapor flows through said sensor tube to said control port at a substantially lower mass flow rate than said bias flow whenever the liquid in said container is below said predetermined level.

3. The apparatus according to claim 1 wherein said sensor tube is arranged to gravity-feed liquid from said container to said control port whenever liquid in said container is above said predetermined level.

4. The apparatus according to claim 1 wherein said pressure-dropping means comprises an adjustable flow restrictor.

5. A fluidic apparatus for controlling the outflow of liquid from a pressurized tank in accordance with the level of liquid in said tank, said apparatus comprising:
   a vortex valve having a chamber of circular cross section, an outlet passage disposed axially of said circular cross section for conducting fluid out of said chamber, a supply inlet port responsive to pressurized fluid applied thereto for issuing a fluid supply flow into said chamber radially of said circular cross section and toward said outlet passage, a bias inlet port responsive to pressurized fluid applied thereto for issuing a bias flow into said chamber tangentially of said circular cross section and in interacting relationship with said supply flow such that said supply and bias flows assume a vortical flow path along which said supply and bias flows egress from said chamber through said outlet passage, and a control inlet port responsive to pressurized fluid applied thereto for issuing a control flow into said chamber tangentially of said circular cross section and in an opposite sense to said bias flow;
   a sensor tube having an inlet end disposed at a predetermined level in said tank and an outlet end connected to said control port for flowing pressurized liquid from said tank to said control port whenever the liquid in said tank is above said predetermined level;
   means for applying liquid outflow from said tank to said supply and bias ports; and
   means for restricting liquid outflow to said bias port sufficiently to prevent creation of a vortex in said chamber whenever liquid in said tank is above said predetermined level.

6. The apparatus according to claim 5 wherein said means for restricting comprises an adjustable flow restrictor.

7. The apparatus according to claim 5 wherein said tank contains liquid and a vapor under pressure, and wherein said vapor flows through said sensor tube to said control port whenever the liquid in said tank is below said predetermined level and liquid flows through said sensor tube to said control port whenever liquid in said tank is above said predetermined level.

8. The apparatus according to claim 7 further comprising means for supplying liquid to said tank at a steady flow rate such that the liquid in said tank limit-cycles about said predetermined level whereby a combination of vapor and liquid flows through said sensor tube to said control port to permit creation of a relatively weak steady vortical flow pattern in said chamber.